United States Patent [19]

Hara et al.

[11] Patent Number: 5,175,999
[45] Date of Patent: Jan. 5, 1993

[54] TORQUE CONVERTER DEVICE WITH LUBRICATING WASHER ON TURBINE HUB

[75] Inventors: Takeshi Hara, Chiryu; Hideji Kato, Okazaki; Kazumasa Tsukamoto, Toyota; Takao Taniguchi, Okazaki, all of Japan

[73] Assignee: Aisin AW Co., Ltd., Japan

[21] Appl. No.: 786,815

[22] Filed: Nov. 5, 1991

[30] Foreign Application Priority Data

Nov. 5, 1990 [JP] Japan .................. 2-299214

[51] Int. Cl.$^5$ .................. F16D 33/00; F01D 25/22
[52] U.S. Cl. .................. 60/339; 415/175
[58] Field of Search .................. 60/339, 330, 361, 364; 415/229, 175

[56] References Cited

U.S. PATENT DOCUMENTS

| | | | |
|---|---|---|---|
| 2,737,423 | 3/1956 | Zeidler | 60/339 X |
| 3,710,570 | 1/1973 | Audiffred et al. | 60/339 X |
| 3,778,194 | 12/1973 | Miller et al. | 415/175 X |
| 3,855,790 | 12/1974 | Rist | 60/361 |
| 4,396,197 | 8/1983 | Shimizu | 415/175 X |
| 4,866,935 | 9/1989 | Hayabuchi et al. | 60/361 |

FOREIGN PATENT DOCUMENTS

| | | | |
|---|---|---|---|
| 518710 | 11/1955 | Canada | 60/361 |
| 60-211160 | 10/1985 | Japan . | |

Primary Examiner—Edward K. Look
Assistant Examiner—John Ryznic
Attorney, Agent, or Firm—Lorusso & Loud

[57] ABSTRACT

Discloses a torque converter device with a light stator and turbine. The torque converter device comprises a converter cover, a turbine hub, a washer provided between the cover and the hub, and an oil flow passage provided between the washer and the turbine hub to lighten the stator.

3 Claims, 2 Drawing Sheets

TORQUE CONVERTER DEVICE WITH LUBRICATING WASHER ON TURBINE HUB

BACKGROUND OF THE INVENTION

1. Field of the Invention

This invention relates to light weight torque converter devices, and in particular to a hydraulic fluid torque converter with a light weight stator and turbine.

2. Description of the Prior Art

The usual hydraulic torque converter used as a power input device of an automatic transmission for vehicles, includes a turbine hub member extending in the axial direction, the outer circumference of the turbine hub provided as the guide surface for sliding in the axial direction of the lock up clutch piston and as the supporting surface for the torque converter for supporting the thrust load received at the front side by the turbine runner.

The automatic transmission for a vehicle should be compact, light, and of high density because it is desirable to provide a multi-speed automatic transmission which simplifies installation in a vehicle, a decrease of a fuel consumption, and drivability. Therefore, the usual torque converter used as the power input for an automatic transmission should also improve the same things.

The usual torque converter, however, is difficult to lighten because of the axial length of the steel turbine hub.

For attaining the above objective it is proposed that the one-way clutch be shorter in axial length and lighter and that the turbine hub be shorter in axial length and lighter. However, this causes the turbine hub to be unsupported through the thrust bearing by the torque converter because such shortening creates a space between the torque converter and the turbine hub. The object of the present invention is to provide a light torque converter which has a converter cover, a turbine hub, a non-steel light washer provided between the cover and the turbine hub for supporting the turbine hub in the axial direction, allowing the turbine hub to be shortened in axial length. To accomplish the above, the torque converter device of the present invention has a converter cover, a turbine hub, a washer provided between the converter cover and the turbine hub, and oil flow passages extending axially and radially between the inner circumference of the washer and the contacting portion of the turbine hub.

Accordingly, a non-steel washer functions as a spacer between the thrust bearing and the turbine hub. The oil flow passages extending in the axial and radial directions include a flow passage through the washer to lead the oil supplied from the shaft center portion to the outer circumference of the torque converter for disengaging the lock up clutch and for supplying the oil to the surface between the washer and the turbine hub and forming an oil film for preventing the washer from wearing.

Therefore, according to the present invention, since it is possible to provide a non-steel washer which is lighter than the turbine hub and can be installed in the space formed by shortening the turbine hub, the shorter turbine hub can be connected to the torque converter in the axial direction without a weight increase, to provide a lighter weight torque converter. These and other objects and advantages of the present invention will become clear from the following description with reference to the accompanying drawings, wherein:

FIG. 1 is a cross-sectional view of one embodiment of the torque converter of the invention; and FIG. 2 is a three dimensional view of the washer.

DESCRIPTION OF PREFERRED EMBODIMENT

Figure 1:
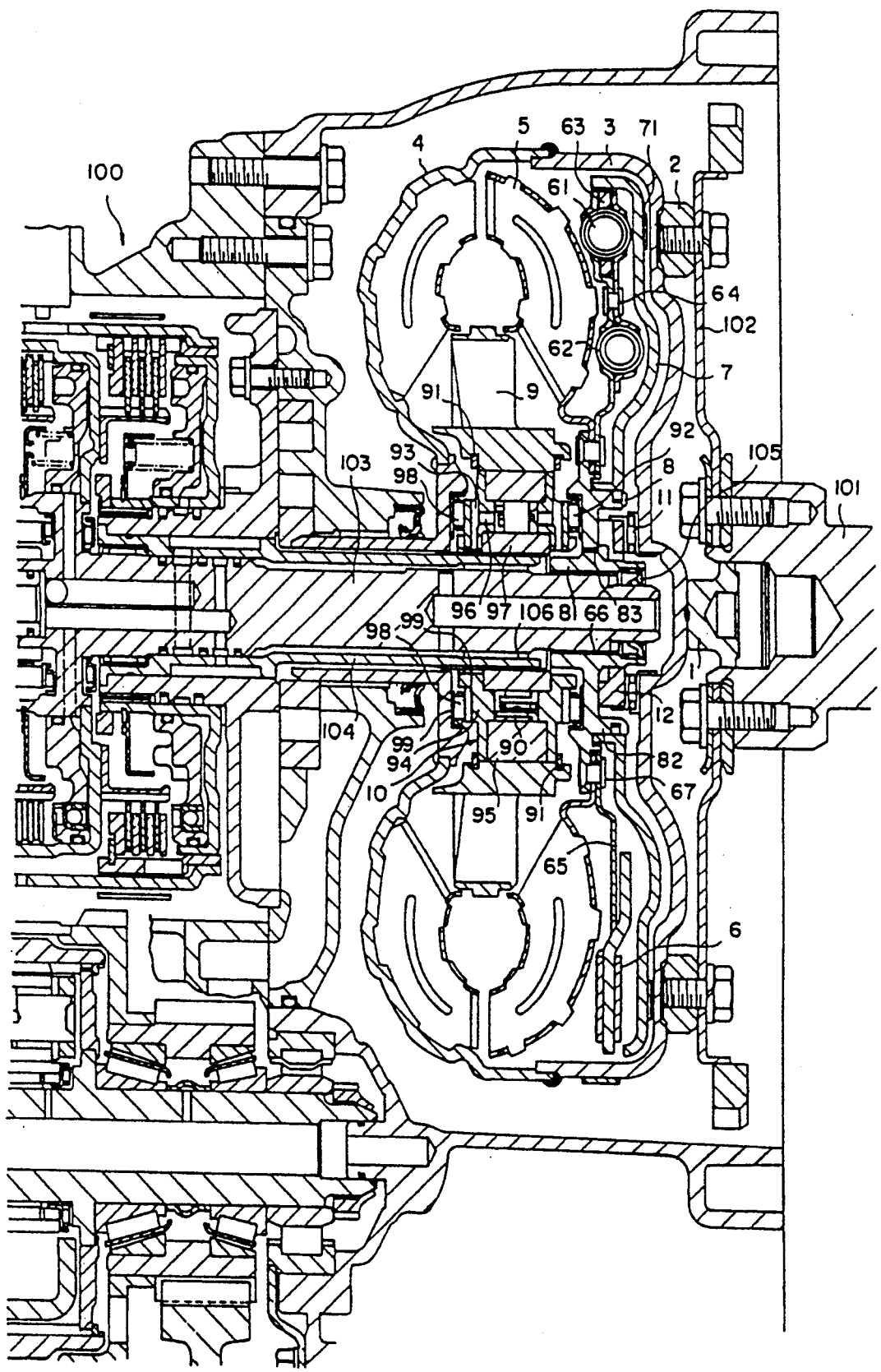

An embodiment of the present invention will now be described with reference to the drawings.

This torque converter, as in the prior art, includes a converter cover 3 connected to an engine crank shaft 101 by engaging a boss 1 axially to the shaft and connecting a drive plate 102 to the boss via a spacer 2, a pump impeller 4 connected to the torque converter cover by welding, a turbine hub 8 slidably supporting a lock-up clutch piston 7 connected to a torsional damper 6 and a turbine runner 5 by rivets. The turbine hub 8 is spline engaged to an input shaft 103 of a transmission 100. A stator 9 is disposed between the pump impeller 4 and the turbine runner 5, and a one-way clutch 10 rotatably supporting the stator is mounted on a fixed hollow shaft 104 of the transmission 100.

In FIG. 1, 61 is a first damper, 62 is a second damper, 63 is a drive plate, 64 is a rivet, 65 is a driven plate, 71 is a frictional member, 83 is an orifice, 90 is a plug, 91 is a snap ring, 92 is a bearing, 93 is a passage conduit, 94 is an end bearing, 95 is an outer race, 96 is a passage, 97 is an inner race, 98 is a bearing, 99 is a race, 105 is a lip type seal and 106 is a bushing.

In a torque converter of this type the one-way clutch 10 is shorter in axial length with an increased number of sprags 90 for maintaining the durability of the sprags without increasing the axial length of the sprags. The front portion of the turbine hub 8 is made lighter by removing its body portion except for the outer cylinder 82 slidably supporting the lock up clutch piston 7 and the inner cylinder 81 engaged with the spline 66 of the input shaft 103. Accordingly, a space is formed between the rear surface of the converter cover 3 and the removed portion of the turbine hub 8. A washer of resin or light alloy such as aluminum is provided between this converter cover 3 and the spaced turbine hub via a thrust bearing 11.

Figure 2:
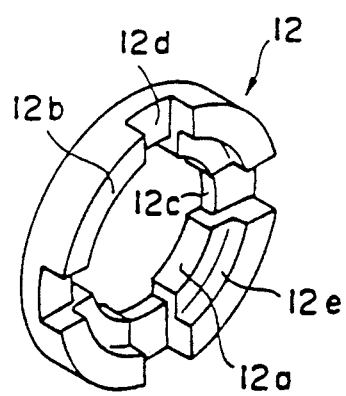

FIG. 2 is a three dimensional view of a non-steel light washer 12. The washer 12, as shown in FIG. 2, has an inner diameter which corresponds to the outer diameter of the inner cylinder 81 of the turbine hub to engage together and an outer diameter such that a sufficient gap is formed between the inner circumference of the outer cylinder 82 of the turbine hub and the outer circumference of the washer. The washer 12 has one flat surface supporting the rear race of the thrust bearing 11 and contacting it at the front side thereof (behind the figure) and the other flat surface contacting the front surface of the turbine hub at the rear side thereof (front side of the figure). The four flow passages 12c and 12d are continuously formed, in the embodiment, to extend from the inner circumferential portion 12a of the washer 12 to the contact portion 12b of the turbine hub 8 in axial and radial directions. The circumference passage 12e, extending from the inner circumference side to the rear surface side, breaks up the oil fluid lead from the oil conduit 12c in axial direction, leaking in the circumferential direction.

Referring to the FIG. 1, in such a torque converter as this, the oil supplied from the shaft 103 via the oil passage of the input shaft 103 is supplied to the outer circumference by flowing to the thrust bearing 11 during lock-up clutch disengagement. Simultaneously, oil is supplied to the circumferential conduit 12e through the oil flow passage 12c of the washer 12 in the axial direction, supplied to the gap between the outer circumference of the washer 12 and the inner circumference of the outer cylinder 82 in the turbine hub oil is also supplied to the outer circumference side between the converter cover 3 and the clutch piston 7 provided by oil passing through the thrust bearing for disengaging the clutch piston. It is unnecessary here to describe the oil fluid control because it is conventional. Since the space formed between the outer circumference of the washer 12 and the inner circumference of the outer cylinder 82 in the turbine hub is ring-shaped space with a certain axial dimension, the oil flow in this space is restricted during pumping oil near the washer to maintain pressure in the circumferential conduit 12e of the washer 12 to supply sufficient oil to form an oil skin on the contacting portion between the washer 12 and the turbine hub 8. Therefore, the wear from the sliding contact during lock-up clutch disengagement is prevented by forming an oil skin on the surfaces in sliding contact.

On the other hand, no oil flow is required during lock-up clutch engagement because there is no relative rotation between the contacting portions. Therefore, it is possible to provide oil flow to it by supplying the oil from the orifice 8 disposed in the turbine hub.

Accordingly, in this embodiment, it is possible to provide a structure in which a non-steel washer, which is lighter than the turbine hub, is mounted in the space formed by shortening the turbine hub. Now the shortened turbine hub can be supported in the axial direction by the torque converter without a weight increase, providing a lighter torque converter. Compared with the usual oil supply method wherein the thrust bearing is lubricated by forming a passage in the thrust bearing race for providing the lock-up clutch disengagement pressure, the present invention provides for flexible passage design because the oil passage may be connected to the washer 12 instead of the above.

Furthermore, since the cross-section of the washer 12 is a distinctive shape, assembly errors such as reverse assembly can be prevented. Since the washer 12 has a circumferential conduit 12e at its inner circumference side, the temperature in the converter compartment is prevented from increasing by using the conduit as a passage for supplying the oil from the converter compartment to the control compartment. In this case, the orifice 83 has only to be provided on the inner circumference of the turbine hub. It is possible to make a circuit for providing oil during lock-up clutch engagement without decreasing the lock-up clutch torque capacity in accordance with the oil supply from the converter compartment to the control compartment via an orifice, same as in the case of connecting the converter compartment directly to the control compartment and providing the orifice in the lock-up piston 7 for attaining the above described object.

Though only one embodiment of the present invention has been explained, it goes without saying that various other embodiments, which include different components from those of the above embodiment, can be provided within the scope of the claims.

We claim:
1. A torque converter comprising:
a converter cover,
a turbine hub rotatably mounted within said converter cover,
a washer provided between the converter cover and the turbine hub, said washer having radial and circumferential grooves defining oil flow conduits extending in axial and radial directions for providing lubrication of the washer and the turbine hub.
2. A torque converter in accordance with claim 1, wherein said turbine hub comprises inner and outer cylindrical portions defining an axially extending recess therebetween and wherein said washer is mounted in said recess.
3. A torque converter in accordance with claim 1 additionally comprising a thrust bearing interposed between said washer and said converter cover.

* * * * *